May 9, 1967  H. SCHMIDT  3,318,342
WIRE-LOOPING MACHINE

Filed Sept. 9, 1964  5 Sheets-Sheet 1

INVENTOR:
Heinrich Schmidt
BY
Mestern, Ross & Mestern

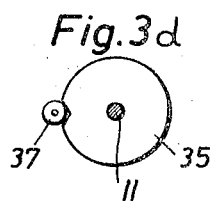
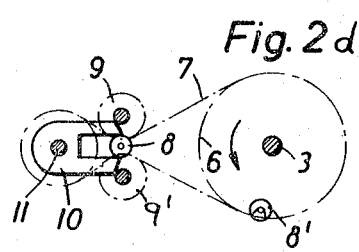
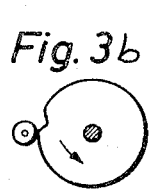
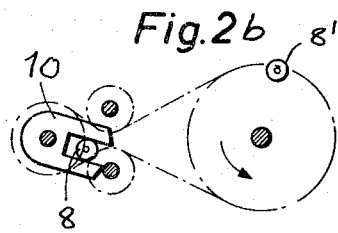
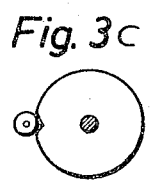
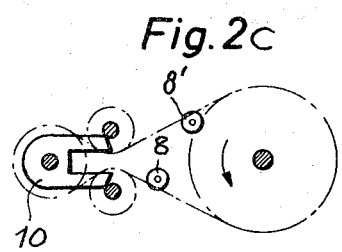
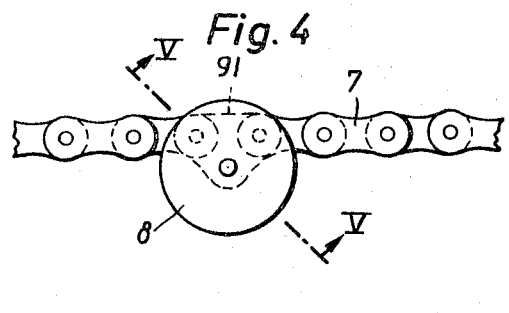
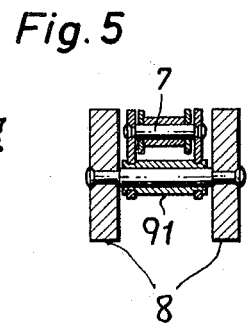
INVENTOR:
Heinrich Schmidt

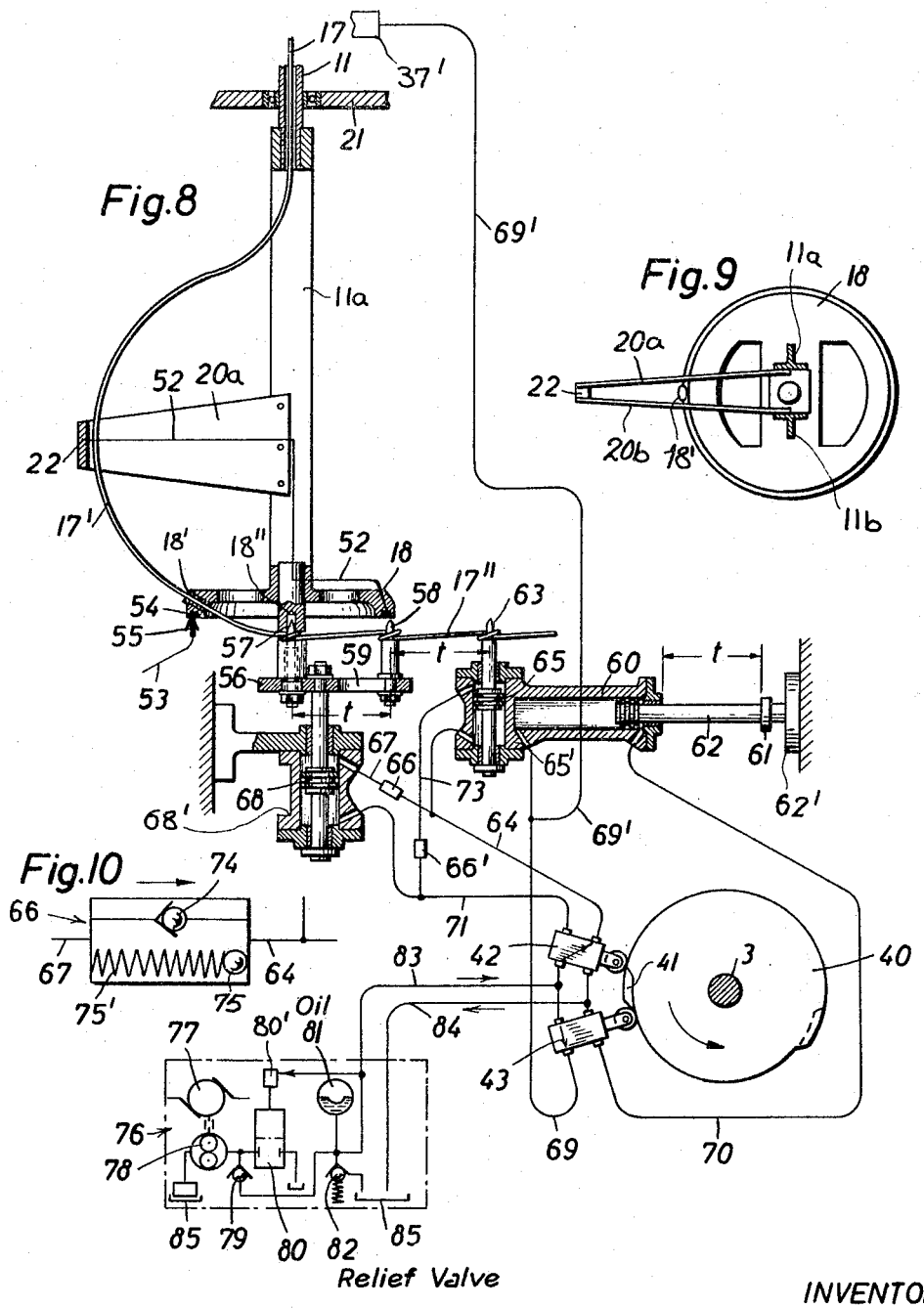

… … …

United States Patent Office 3,318,342
Patented May 9, 1967

3,318,342
WIRE-LOOPING MACHINE
Heinrich Schmidt, Dusseldorf-Oberkassel, Germany, assignor to Hein, Lehmann & Co. Aktiengesellschaft, Dusseldorf, Germany, a corporation of Germany
Filed Sept. 9, 1964, Ser. No. 395,220
11 Claims. (Cl. 140—102)

My present invention relates to a wire-looping machine of the general type disclosed in my prior Patent No. 3,050,089, issued August 21, 1962, in which a wire is intermittently drawn from a supply reel and formed into a succession of equispaced closed loops with the aid of a spindle which periodically rotates about its axis. As the spindle rotates, the wire is wound about a first or looping pin coaxial therewith while another loop previously formed is held engaged by a second or distance pin to determine the exact spacing between the loops. The third or feed pin enters another loop formed still earlier and, upon the withdrawal of the first two pins from their respective loops, moves radially outwardly with reference to the spindle axis to align the last-formed loop with the second pin by entraining the wire preparatorily to the commencement of a new looping cycle.

Heretofore, as disclosed in the patent, the spindle itself served as a mount for the supply reel which, therefore, was rotated intermittently along with the spindle. A drawback of such arrangement is the fact that the supply reel, rotating about its own axis during the outward displacement of the feed or transport pin, thereafter comes to rest and must be restarted at the beginning of the next entrainment in response to the tensioning of the wire by the radially moving third pin. The sudden starts and stops stress the wire and tend to contract the loops already formed therein so that they no longer maintain their original shape and spacing with the required exactitude. This is particularly true in the case of thinner wires, in view of the fact that the tensile strength of a wire and the elastic deformability of its loops vary inversely with the third and the fourth power, respectively, of the wire diameter (other parameters being equal). Moreover, in the manufacture of netting or screens from such looped wires it is usually necessary to increase the number of loops per unit of length as the wire thickness is reduced, hence during the looping of a given length of thin wire there will be a larger number of starts and stops than in the case of heavier wires.

It is, therefore, a general object of my present invention to provide an improved machine of the character disclosed in my above-identified patent which eliminates this stressing of the looped wire for the periodic restarting of its supply reel.

A more particular object of my invention is to provide means in such machine for enabling continuous rotation of a supply reel at least about the spindle axis, notwithstanding the intermittent motion of the spindle itself, so that the energy formerly needed for overcoming the inertia of the combined spindle and reel mount will be substantially reduced and a considerable increase in output, particularly with relatively thin wires, will be realized.

It is also an object of my present improvement to provide means for determining the size of a length of slack wire, previously drawn from the reel preparatorily to a looping and entrainment operation, in conformity with the spacing of successive loops and to arrest a wire feeder associated with the supply means upon attainment of the desired length of slack.

The foregoing objects are realized, in accordance with this invention, by the provision of a rotatable mount for the supply reel in line with the spindle but separate therefrom, the reel mount being connected via a chain or other positive-action transmission with a source of driving power for continuous rotation thereby whereas the spindle is coupled with that source for intermittent rotation so as to make a full turn during a fraction of an operating cycle corresponding to a rotation of the reel mount. At the beginning of each new cycle, thus prior to the outward movement of the transport pin to entrain the wire by a distance equaling a loop separation, a feeder advantageously disposed next to the supply reel on the mount thereof operates to draw from the wheel a sufficient length of slack wire to permit the entrainment of the wire without substantial tensioning.

Although ideally it would be desirable to operate the wire feeder at precisely the rate needed for the slack required by the transport pin, with steady rotation of the reel about its own axis (though its speed would progressively increase with shrinking reel diameter), such exact dimensioning of the parts is usually not realizable. It is, therefore, contemplated to drive the feeder at a somewhat faster rate and to provide stop means for arresting this feeder as soon as the length of slack wire has attained a predetermined size. Even so, the rotation of the reel about its axis need not come to a complete halt during each cycle and its return to full speed, brought about by traction upon a piece of wire not yet looped, can be more gradual since the part of a cycle available for the buildup of the slack is usually much longer than the fraction reserved for the entrainment of the wire by the transport pin during which the reel had to be started and stopped in the prior system.

The wire feeder may comprise a pair of friction rollers rotated either by the reel-mount drive or by a separate motor. In the first case the rollers may be spring-biased apart from each other, thereby facilitating continued rotation of the reel by inertia (thus, at a decreasing rate) after the desired length of slack wire has been payed out, and may be urged together by an electromagnetic or equivalent clutch in the unoperated condition of the stop means. In the second case the motor itself may become de-energized upon operation of the stop means. The latter, according to a more specific feature of my invention, comprises advantageously a conductive contact element carried on a guide arm which extends radially from the spindle, this guide arm accommodating a looped portion of the wire located in an axial plane of the spindle and constituting the desired length of slack. When this looped portion has grown so that the wire engages the contact element carried on the free end of the arm, a circuit is closed for the actuation of the stop means which may be a relay having interrupter contacts in series with the electric clutch or the separate drive motor mentioned above.

The continuous rotation of the reel mount and the intermittent rotation of the spindle about a common axis result in a limited twisting of the wire during each cycle successively in opposite directions, e.g. by ±90° if the rotation of the spindle takes half a cycle. Since the resultant twist over a complete cycle is zero, its occurrence at certain stages of a cycle is insignificant if a reasonable distance is maintained between the reel mount and the wire-engaging part of the spindle, generally the lower end thereof.

The above and other objects, features and advantages of my invention will become more fully apparent from the following detailed description, reference being made to the accompanying drawing in which:

FIGS. 2a–2d show the spindle drive of the machine in successive phases of an operating cycle;

FIGS. 3a–3d illustrate another portion of the machine, i.e. a spindle brake, in successive phases of operation corresponding to FIGS. 2a–2d;

FIG. 4 is a detail view of an element of the spindle drive shown in FIGS. 2a–2d;

FIG. 5 is a cross-sectional view taken along the line V—V of FIG. 4;

FIG. 8 is another partial view of the machine, showing the associated hydraulic system;

FIG. 9 is a cross-sectional view taken on the line IX—IX of FIG. 1;

FIG. 10 is a detail view of a valve element forming part of the hydraulic circuit of FIG. 8.

Figure 1:
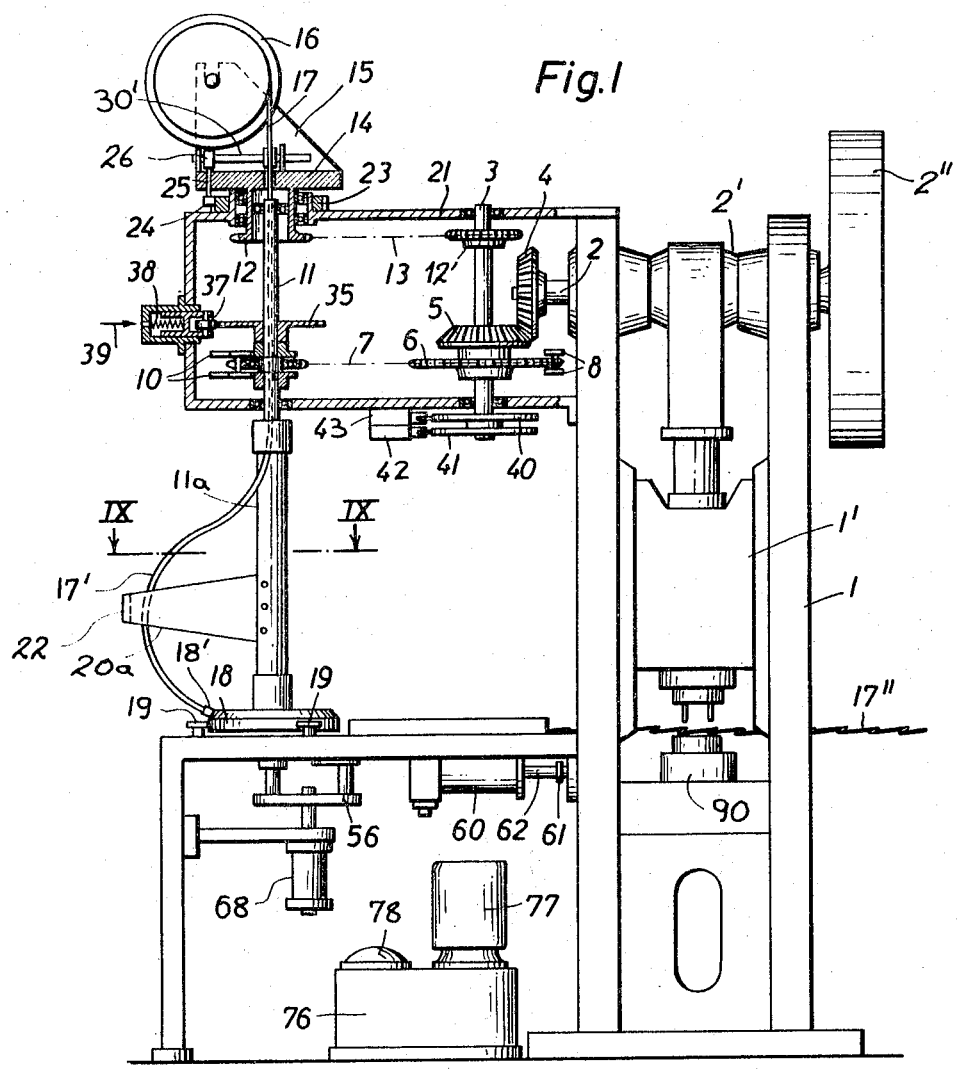
FIG. 1 is a side-elevational view of the machine in its entirety (parts broken away)

The machine illustrated in FIG. 1 is broadly similar to that disclosed in my above-identified prior patent and comprises a frame 1 in which a ram 1' is guided for vertical reciprocation under the action of an eccentric 2' on a horizontal shaft 2 carrying a flywheel 2". The ram 1' has been shown, for the sake of clarity, in its upper dead-center position spaced from its anvil 90, yet in actual use the ram will have descended into its lower dead-center position when the remaining elements of the machine occupy the position illustrated in FIG. 1.

An auxiliary shaft 3 is journaled vertically in a housing extension 21 of the press frame 1 and is continuously driven from the conventionally powered main shaft 2 through the intermediary of a pair of bevel gears 4, 5. Since the tooth ratio of bevel gears 4, 5 equal unity, shaft 3 rotates in step with shaft 2.

Shaft 3 carries a sprocket wheel 6 forming part of a Geneva-type transmission, to be more fully described with reference to FIGS. 2a–2d, for intermittently rotating a tubular spindle 11 about its vertical axis. The upper end of spindle 11 is coaxially surrounded by the hub of a sprocket wheel 12 which is independently rotated from shaft 3 through the intermediary of another sprocket wheel 12' of like size and a chain 13 in engagement therewith, the transmission 12, 12', 13 insuring continuous rotation of a mounting plate 14, rigid with sprocket 12, at the same rate as shafts 2 and 3.

As best illustrated in FIGS. 2a–2d, the Geneva-type transmission between shaft 3 and spindle 11 comprises a chain 7 embracing the sprocket wheel 6, this chain being also looped about the spindle 11 and being guided by a pair of idler sprockets 9, 9'. Chain 7 is divded into several sections of uniform length, each equal to the circumference of sprocket 6, by a plurality of dogs 8, 8' (only two dogs being used in the present embodiment). A bifurcate member 10 is fixedly mounted on spindle 11 for engagement of its prongs with either of the dogs 8, 8' upon their passage around the spindle axis.

Figures 2A, 3A:
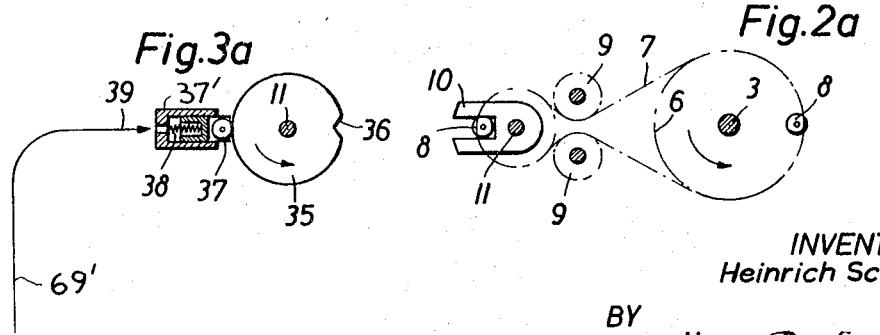

FIG. 2a illustrates the position of the Geneva drive corresponding to the relationship of the parts illustrated in FIG. 1, the dog 8 having entered the bifurcation of member 10 and having rotated the spindle 11 through 180° from its normal resting position (illustrated in FIGS. 2c and 2d); the other dog 8' is located at this moment midway along the engaged peripheral portion of sprocket 6. FIG. 2b shows the member 10 approaching its normal position, the dog 8 being about to disengage itself therefrom. In FIG. 2c the spindle 11 with member 10 has completed a full revolution, whereas in FIG. 2d the dog 8' is about to enter the bifurcation of member 10 for a new cycle of operations. It will thus be apparent that spindle 11 remains quiescent for half a cycle and makes a full turn during the remaining half, thus at an angular velocity which is double that of the reel mount 14.

As shown in FIGS. 4 and 5, each dog 8, 8' is constituted by a pair of circular disks on opposite sides of chain 7; the disks are bridge by a triangular bracket 91 securing them to the chain. It will also be noted from FIG. 1 that the bifurcate member 10 is similarly duplicated for coaction with the two disks.

The spindle 11 also carries an indexing disk 35 with an indentation 36, this disk being disposed adjacent an indexing roller 37 which is urged against its periphery by a spring 38 for the purpose of releasably retaining the spindle 11 in the resting position of FIGS. 2c, 3c and 2d, 3d. The force of spring 38 can be momentarily supplemented, in a manner more fully described hereinafter with reference to FIG. 8, by the pressure of a hydraulic fluid supplied to an associated piston cylinder 37' through a conduit 69, as symbolized by an arrow 39 in FIG. 3a. This supplemental force becomes effective during the latter part of the rotation of the spindle, i.e. upon the approach of indentation 36 to roller 37, and is relieved before the system reaches the position of FIGS. 2d and 3d so as not to oppose the start of a new revolution.

The lower end of spindle 11, projecting from housing 21, is formed in part by two transversely spaced uprights 11a, 11b (see also FIGS. 7–9) having two radially extending arms 20a, 20b of nonconductive material secured thereto, these arms serving as a guide for a metal wire 17 to be looped by the machine and being interconnected at their free ends by an electrically conductive contact element 22. Wire 17, which passes through the tubular upper part of spindle 11, is drawn off a reel 16 supported on mounting plate 14 by a pair of upstanding brackets 15, 15'. At the stage of operations illustrated in FIG. 1, wire 17 forms a looped portion 17' between upright 11a, 11b and the arms 20a, 20b, this looped portion bulging out to the contact element 22 at the end of the two arms. A flange 18 integral with the lower end of spindle 11 is guided for rotation by at least three bearing rollers 19 and is provided with an orifice 18' traversed by the wire. The bottom of the spindle has an eccentric bore 18" (see FIG. 8) adapted to receive a looping pin 57 which is carried, together with a distance pin 58, on a common holder 56 having a slot 59 in which the pin 58 is adjustably secured. Holder 56 is fixed to a hydraulic piston 68 in a cylinder 68'. Another holder, constituted by a piston 65 in a cylinder 65', carries a third pin 63 and is in turn supported by a cylindrical carrier 60 which is horizontally displaceable with reference to a stationary piston 62. The stroke of cylinder 60 is limited by an adjustable collar 61 on piston 62, the piston itself being axially displaceable in its mount 62' so that the same distance $t$ (corresponding to the desired loop spacing) may be selected for the relative spacing of the three pins 57, 58, 63 and for the stroke length of cylinder 60 which determines the distance along which the looped wire 17' is transported during each cycle.

The hydraulic operation of the pin holders 56 and 65 as well as the carrier cylinder 60 is controlled by a pair of valves 42, 43 in timed relationship with the rotation of shaft 3, the timing mechanism including a pair of cam disks 40, 41 on shaft 3 respectively co-operating with these valves. The mode of operation, generally similar to that described in my prior patent, will be summarized below.

Figure 6:
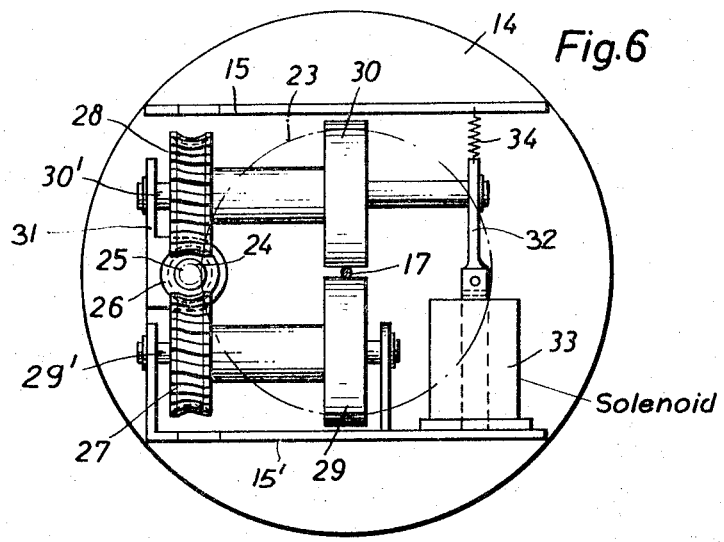
FIG. 6 is a top plan view of the supply-reel mount of the machine (with the reel removed), drawn to a larger scale.
Figure 7:
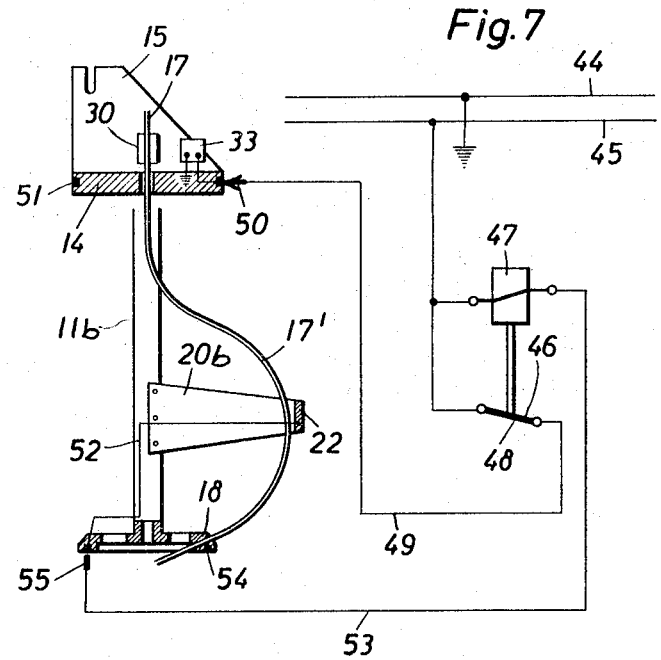
FIG. 7 shows part of the machine together with an associated circuit diagram.

Reference will now be made to FIGS. 6 and 7 for a description of a wire-feeding mechanism carried on the reel mount 14 of the machine shown in FIG. 1. An angular rack 23 fixed to the housing 21 meshes with a pinion 24 on a shaft 25 which is rotatably journaled in the mounting plate 14 and terminates above the plate in a worm 26 meshing with a pair of worm gears 27, 28. The shafts 29', 30' of these worm gears carry a pair of friction rollers 29, 30 bearing upon the wire 17 from opposite sides. Shaft 29' is fixedly journaled in bracket 15' whereas shaft 30' is mounted in another bracket 31, rotatable with the shaft 25, so that roller 30 can be swung outwardly and away from its companion roller 29 under the action of a tension spring 34 anchored to bracket 15. A solenoid 33 has its armature 32 connected to the other end of a shaft 30' so as to urge, in its energized state, the two rollers 29, 30 into frictional contact with the wire 17 clamped therebetween. Thus, solenoid 33 constiutes an electromagnetic clutch adapted to transmit the rotation of shaft 3, via shaft 25 and associated gear members, to the frictional feeder 29, 30.

As illustrated in FIG. 7, the solenoid 33 is normally enregized from a source of current, represented by a grounded wire 44 and a live wire 45, via a normally closed armature 48 and back contact 46 of a relay 47, a conductor 49 and a brush 50 contacting a slip ring 51 insulatedly imbedded in the periphery of plate 14, this slip ring being connected to a terminal of solenoid 33 whose other terminal is shown grounded at plate 14. The voltage of source 44, 45 is relatively low, e.g. not more than 42 volts, for reasons of safety. A conductor 53 connects the winding of relay 47 between bus bar 45 and a brush 55 contacting a slip ring 54 insulatedly imbedded in the underside of flange 18, this slip ring being connected through a lead 52 with the contact element 22. Since wire 17 is grounded, the engagement of its bulge 17' with contact element 22 closes the operated circuit for relay 47 so that solenoid 33 is de-energized at armature 48 and releases the wire 17 from the grip of feed rollers 29, 30, thereby arresting the further drawing of wire from reel 16 except for a possible continuing rotation of this reel by its own inertia; if this is undesirable, the reel may be suitably braked.

Figure 11:
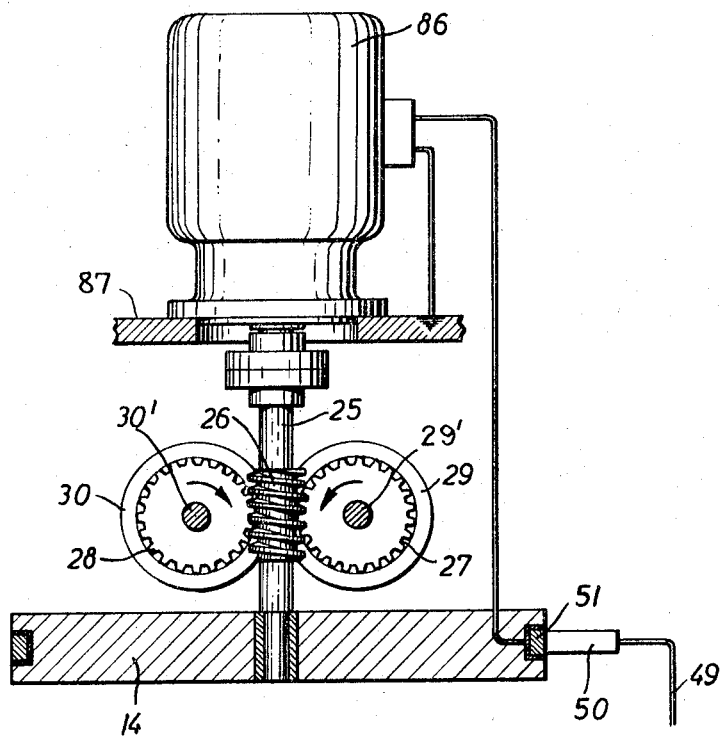
FIG. 11 is a sectional elevational view of a modified reel mount for the machine shown in FIG. 1.

According to the modification shown in FIG. 11, the pinion 24 and its rack 23 are omitted while the shaft 25 is driven directly from a motor 86 supported on a platform 87 above plate 14. The energizing circuit 49–51 now leads to the input of motor 86, shaft 30' being now journaled in fixed bearings with omission of solenoid 33 and spring 34. Thus, motor 86 will drive the friction rollers 29, 30 by way of shaft 25, worm 26 and worm gears 27, 28 as long as relay 47 (FIG. 7) is not operated, i.e. as long as the slack wire portion 17' does not reach the contact element 22. The operation of the wire feeder of FIG. 11 is otherwise analogous to that of the arrangement shown in FIG. 6.

The hydraulic system illustrated in FIG. 8 includes a fluid source, generally designated 76, which comprises an electric motor 77 driving a pump 78 which works through a check valve 78 into a high-pressure line 83. A relief valve 82, normally held closed by a spring, allows the return of excess fluid from line 83 to the sump 85 at which a low-pressure line 84 also terminates. An oil reservoir 81, comprsing, for example, an expandable bladder, determines a maximum line pressure at which a controller 80' opens a bypass 80 from the discharge side of pump 78 to the sump 85.

A hydraulic conduit 64 leads from valve 42 to the bottom of cylinder 65' and, by way of a hydraulic resistance 66, to an extension 67 terminating at the top of cylinder 68'. Another hydraulic conduit extends from valve 42 to the bottom of cylinder 68' and, through a hydraulic resistance 66', to an extension 73 terminating at the top of cylinder 65'. A further conduit 69 extends from valve 43 to the left-hand end of cylinder 60 and has an extension 69' terminating at the cylinder 37' whose piston carries the indexing roller 37, as already described in connection with FIG. 3a, while still another line 70 leads from valve 43 to the right-hand end of cylinder 60.

The construction of hydraulic resistance 66 (and therefore also resistance 66') has been illustrated in detail, albeit schematically, in FIG. 10. This device comprises a check valve 74, permitting fluid to flow substantially unimpeded in the direction of the arrow (i.e. from line 67 to line 64), and a check valve 75 loaded by a spring 75' which opens the path in the opposite direction only after a certain hydraulic pressure has been built up in line 64.

The valve of the main shaft 2 is so arranged that, in a manner known per se and not further illustrated, the ram 1' stops in its upper dead-center position when power is cut off, valve 43 being so controlled by its cam 40 as to maintain line 83 connected with line 70 at this instant so that cylinder 60 is moved toward the right and looped wire 17'' is entrained by the pin 63 until the loop last formed therein is aligned with the distance pin 58. At that time also, oil has entered the cylinders 65' and 68' by way of valve 42 and lines 64 and 67, respectively, so that pin 63 is elevated and pins 57, 58 are lowered. The bulge 17' has been substantially flattened by the pulling of the looped wire and the spindle 11 with its associated parts is in its normal position shown in FIGS. 2d and 3d.

When the machine is restarted, ram 1' begins to descend in order to flatten part of the looped wire section 17'' and the feed mechanism of FIG. 6 or 11 starts drawing a length of wire from the reel 16 to form the bulge 17'. At this time the cams 40, 41 have set the valves 42, 43 in such a way that fluid pressure in line 71 has raised the piston 68 to introduce the pin 58 into the loop previously formed and to insert the pin 57 into the bore 18'' of spindle 11 preparatorily to the formation of a new loop, the piston 65 having been lowered while the fluid pressure in line 69 has moved the cylinder 60 toward the left. In the interval between the application of pressure to the lines 71 and 69, due to the relative staggering of cams 40, 41 and of valves 42, 43, the spindle has rotated out of its normal position to form the new loop. The pressure rise in line 69', which becomes fully effective only when the cylinder 60 has reached its extreme left-hand position, occurs after the start of this rotation and serves to intensify the contact between indexing roller 37 and disk 35 preparatorily to a rearrestation of the spindle in its home position. When the spindle reaches that position after having gone through a full cycle, the cams 40, 41 are in the position shown in FIG. 8 in which cam 41 has just reversed the valve 42 to connect the high-pressure line 83 with line 64, thereby raising the piston 65 to introduce the pin 63 into the loop now aligned therewith and, following a delay caused by hydraulic resistance 66, lowering the piston 68 to withdraw the pistons 57 and 58 from their respective loops; it will be seen that, with this arrangement, there is always at least one pin in engagement with a loop of wire portion 17'' to insure the correct positioning thereof. Shortly thereafter, cam 40 reverses the valve 43 so that line 83 communicates with line 70, thereby starting the traction stroke of cylinder 60 and relieving the pressure in line 69' in preparation of the next spindle rotation. The rightward advance of looped wire 17'', by a distance equal to $t$, shrinks the bulge 17' so that the feeder on reel mount 14 is reoperated as the wire portion 17' breaks contact with conductor element 22. During this half of the cycle, in which the looped wire 17'' is advanced, ram 1' returns to its upper dead-center position.

The length of bulge 17', as determined by the spacing of element 22 from the spindle axis, should of course equal or exceed the maximum loop spacing $t$ (augmented by the length of wire consumed by a loop) whereby the slack of the bulge will be only partly used up whenever the loop spacing is reduced. Naturally, the position of element 22 could also be made adjustable to vary the bulge in conformity with the spacing $t$. These and other modifications will be readily apparent to persons skilled in the art and are intended to be embraced within the spirit and scope of my invention as defined in the appended claims.

I claim:

1. In a machine for forming a succession of equispaced closed loops on a wire, comprising a support, a spindle on said support, rotatable mounting means in line with said spindle for holding a supply reel for a wire to be looped, a first pin, a second pin and a third pin spacedly positioned parallel to one another along a path for said wire transverse to the axis of said spindle, said first pin being coaxial with said spindle, said second pin being disposed between said first and third pins at a predetermined distance from said axis, first holder means for said first and second pins displaceable in axial direction of said spindle between one position in which said first and second pins are withdrawn from said path, second holder means for said third pin displaceable in axial direction of said spindle between one position in which said third pin traverses said path and another position in which said third pin is withdrawn from said path, a carrier connected with said second holder means and reciprocable along said path together with said third pin, continuously operable drive means, coupling means between said drive means and said spindle for entraining the latter through a full turn about its axis to form a loop of wire during a fraction of an operating cycle of said drive means and for maintaining said spindle stationary against rotation during the remainder of said cycle, and timer means controlled by said drive means and coupled with said first and second holder means and said carrier for sequentially performing the following operations in the course of said cycle:

(1) displacement of said first holder means into said one position thereof during standstill of said spindle, thereby introducing said second pin into a second loop previously formed in said wire, said third pin being concurrently maintained by said carrier at a location relatively remote from said axis with said second holder means in said one position thereof;

(2) displacement of said second holder means into said other position thereof upon beginning rotation of said spindle;

(3) movement of said carrier to a location relatively close to said axis at which said third pin is aligned with a third loop formed in said wire before said second loop;

(4) displacement of said second holder means into said one position thereof for introducing said third pin into said third loop;

(5) displacement of said first holder means into said other position thereof upon completion of the rotation of said spindle and formation of a loop around said first pin whereby said first and second pins are withdrawn from their respective loops; and (6) advancement of said carrier into said relatively remote location with entrainment of said wire by said third pin over a distance sufficient to align said second pin with a loop formed earlier in said wire, the combination therewith of transmission means connecting said drive means with said mounting means for continuously rotating the latter together with said supply reel about the axis of said spindle, and feed means operable at the beginning of each new cycle for drawing from said supply reel a length of slack wire sufficient to permit the advancement of said carrier into said relatively remote location without substantial tensioning of the entrained wire.

2. The combination defined in claim 1, further comprising stop means controlled by said length of slack wire for arresting said feed means upon said length of wire attaining a predetermined size.

3. The combination defined in claim 2 wherein said spindle is provided with radially projecting guide means for said wire adapted to accommodate a looped portion thereof, said guide means being provided with contact means engageable by said looped portion for completing an energizing circuit for said stop means.

4. The combination defined in claim 3 wherein said feed means comprises a pair of coacting pressure rollers supported by said mounting means.

5. The combination defined in claim 4 wherein said feed means further comprises electric clutch means normally urging said rollers into frictional contact with said wire, said stop means including a relay having interrupter contacts in series with said clutch means.

6. The combination defined in claim 4 wherein said feed means further comprises a normally energized motor for driving said rollers, said stop means including a relay having interrupter contacts in series with said motor.

7. The combination defined in claim 1 wherein said coupling means comprises a sprocket wheel continuously rotatable by said drive means, a bifurcate member positively coupled with said spindle and rotatable about an axis parallel to that of said sprocket wheel, a sprocket chain engaging said sprocket wheel and encompassing said axis, and a plurality of dogs on said chain separated by like intervals from one another and engageable with the bifurcation of said member for rotating the latter through 360° upon engagement therewith, the length of said chain equalling the circumference of said sprocket wheel multiplied by the number of said dogs.

8. The combination defined in claim 7 wherein said transmission means includes a shaft parallel to said spindle, said sprocket wheel being carried on said shaft and said member being carried on said spindle.

9. The combination defined in claim 1, further comprising indexing means for releasably maintaining said spindle in a predetermined angular position during standstill.

10. The combination defined in claim 9, further comprising timer-controlled means for intensifying the retaining action of said indexing means just prior to completion of the rotation of said spindle.

11. The combination defined in claim 10 wherein said timer means comprises a hydraulic system, said timer-controlled means including a branch of said system leading to said indexing means and connected to receive fluid under pressure substantially concurrently with the movement of said carrier to said relatively close location.

References Cited by the Examiner
UNITED STATES PATENTS

| | | |
|---|---|---|
| 1,042,112 | 10/1912 | Hartman. |
| 1,326,541 | 12/1919 | Soderlund _____ 140—102 |
| 1,801,108 | 4/1931 | Reufel et al. _____ 140—102 X |
| 3,050,089 | 8/1962 | Schmidt _____ 140—102 |

WILLIAM J. STEPHENSON, *Primary Examiner.*